US010591293B2

(12) United States Patent
Gadicherla et al.

(10) Patent No.: US 10,591,293 B2
(45) Date of Patent: Mar. 17, 2020

(54) DETECTING AN INCORRECT ALTIMETER SETTING (71) Applicant: Honeywell International Inc., Morris Plains, NJ (US)

(72) Inventors: Madhava Gadicherla, Bangalore (IN); Saravanakumar Gurusamy, Coimbatore (IN); Jayasenthilnathan B, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/057,418

(22) Filed: Aug. 7, 2018

(65) Prior Publication Data
US 2020/0049500 A1 Feb. 13, 2020

(51) Int. Cl.
*G01C 5/06* (2006.01)
*G08G 5/00* (2006.01)
*G01C 5/00* (2006.01)

(52) U.S. Cl.
CPC .............. *G01C 5/06* (2013.01); *G01C 5/005* (2013.01); *G08G 5/0008* (2013.01); *G08G 5/0021* (2013.01)

(58) Field of Classification Search
CPC .................................. G01C 5/06; G01C 5/005
USPC ........................................................ 73/384
See application file for complete search history.

(56) References Cited

U.S. PATENT DOCUMENTS

| 3,839,626 | A | * | 10/1974 | Klem ...................... G01C 5/06 73/384 |
| 7,778,745 | B2 | | 8/2010 | Conner et al. |
| 7,809,405 | B1 | * | 10/2010 | Rand .................... G08G 5/0013 455/431 |
| 7,873,446 | B2 | * | 1/2011 | Shehi ..................... G01C 5/005 340/977 |

(Continued)

FOREIGN PATENT DOCUMENTS

| WO | 2010069934 A1 | 6/2010 |
| WO | 2016125139 A2 | 8/2016 |

OTHER PUBLICATIONS

Price, "NATS Report: The viability and Safety Benefits of using Mode-S Barometric Pressure Setting," accessed from https://www.skybrary.aero/bookshelf/books/1401.pdf, Oct. 29, 2010, 14 pp.

(Continued)

*Primary Examiner* — Jamel E Williams
(74) *Attorney, Agent, or Firm* — Shumaker & Sieffert, P.A.

(57) ABSTRACT

The disclosure is directed to techniques that use a data communication system such as ADS-B to provide an output to alert an aircraft operator of an incorrect barometric pressure setting for a pressure altimeter, and provide the correct altimeter setting. For example, the system may compile the ADS-B Out data from other aircraft operating near a first aircraft to provide the barometric pressure setting in use by the other aircraft. A system of this disclosure may identify the altimeter setting used by majority of the other aircraft in a region of airspace. If a first aircraft's current barometric altimeter setting is different from the setting of the majority of the nearby aircraft, then the system may generate an output to alert the operator of the first aircraft of a potential incorrect altimeter setting as well as provide a suggested barometric altimeter setting.

20 Claims, 4 Drawing Sheets

(56) References Cited

U.S. PATENT DOCUMENTS

| | | | |
|---|---|---|---|
| 2004/0186635 A1* | 9/2004 | Manfred | G01C 5/06 |
| | | | 701/4 |
| 2006/0167618 A1* | 7/2006 | Werback | G08G 5/0008 |
| | | | 701/120 |
| 2009/0189787 A1* | 7/2009 | Khatwa | G01C 5/06 |
| | | | 340/970 |
| 2015/0097723 A1 | 4/2015 | Bauman | |
| 2015/0212782 A1 | 7/2015 | Samuthirapandian et al. | |

OTHER PUBLICATIONS

"The Tenth Meeting of Automatic Dependent Surveillance—Broadcast (ADS-B) Study and Implementation Task Force (ADS-B SITF/10), Agenda Item 3," International Civil Aviation Organization, CAAS, Apr. 26-29, 2011, 4 pp.

Extended Search Report from counterpart European Application No. 19189246.2, dated Dec. 19, 2019, 9 pp.

* cited by examiner

DETECTING AN INCORRECT ALTIMETER SETTING

TECHNICAL FIELD

The disclosure relates to aircraft avionics.

BACKGROUND

Aircraft include numerous electronic systems, which are commonly referred to as avionics. Avionic systems include communication systems, navigation systems, aircraft management systems, and numerous other systems and sensors. One such sensor is an aircraft pressure altimeter that measures the outside air pressure to estimate the altitude of the aircraft.

SUMMARY

In general, this disclosure is directed to techniques that use a data communication system, such as Automatic Dependent Surveillance-Broadcast (ADS-B), to determine an incorrect barometric pressure setting for the pressure altimeter. In some examples, the data communication system may also provide the correct altimeter setting that the flight crew or aircraft operator should use. The techniques of this disclosure may use ADS-B Out data from other aircraft and ADS-B ground stations in the local area to provide the barometric pressure setting in use by the other aircraft. A system of this disclosure may create a sample set of other aircraft in the vicinity of a first aircraft and identify the altimeter setting used by majority, or some other measure of central tendency, of the other aircraft. If the first aircraft's current barometric pressure setting is different from the setting of the majority of the nearby aircraft sharing the same airspace then the system may output an indication of a potential incorrect altimeter setting, such as an alert to the operator of the first aircraft. For example, if the first aircraft is using 29.89 inches of mercury (in Hg) and the majority of other aircraft are using 29.86, then an alerting message may be provided to the flight crew, as well as providing a recommended altimeter setting.

In one example, the disclosure is directed to a method comprising: receiving, by processing circuitry on a first aircraft, a barometric pressure setting for a pressure altimeter on the first aircraft; receiving, by the processing circuitry and via a communications device, a plurality of barometric pressure settings from a plurality of aircraft, wherein the plurality of aircraft does not include the first aircraft; calculating, by the processing circuitry, a measure of central tendency for the plurality of barometric pressure settings; comparing, by the processing circuitry, the barometric pressure setting for the first aircraft to the measure of central tendency of the plurality of barometric pressure settings; determining, by the processing circuitry, that the barometric pressure setting for the first aircraft is different from the measure of central tendency of the plurality of barometric pressure settings; in response to determining that the barometric pressure setting for the first aircraft is different from the measure of central tendency of the plurality of barometric pressure settings, generating, by the processing circuitry, an output indicating that the barometric pressure setting for the first aircraft is different from the measure of central tendency of the plurality of barometric pressure settings.

In one example, the disclosure is directed to a system comprising: a pressure altimeter; a communications device; an output device; processing circuitry installed on a first aircraft, the processing circuitry in signal communication with the pressure altimeter, the communications device and the output device, wherein the processing circuitry is configured to: receive a barometric pressure setting for the pressure altimeter on the first aircraft; receive via the communications device, a plurality of barometric pressure settings from a plurality of aircraft, wherein the plurality of aircraft does not include the first aircraft; calculate a measure of central tendency for the plurality of barometric pressure settings; compare the barometric pressure setting for the first aircraft to the measure of central tendency of the plurality of barometric pressure settings; determine that the barometric pressure setting for the first aircraft is different by more than a threshold amount from the measure of central tendency of the plurality of barometric pressure settings; and in response to determining that the barometric pressure setting for the first aircraft is different from the measure of central tendency of the plurality of barometric pressure settings, generating an output indicating that the barometric pressure setting for the first aircraft is different from the measure of central tendency of the plurality of barometric pressure settings.

In one example, the disclosure is directed to a computer-readable storage medium comprising instructions for causing programmable processing circuitry to: receive a barometric pressure setting for the pressure altimeter on a first aircraft, wherein the programmable processing circuitry is installed on the first aircraft and in signal communication with the pressure altimeter, a communications device and an output device, each of which is installed on the first aircraft; receive via the communications device, a plurality of barometric pressure settings from a plurality of aircraft, wherein the plurality of aircraft does not include the first aircraft; calculate a measure of central tendency for the plurality of barometric pressure settings; compare the barometric pressure setting for the first aircraft to the measure of central tendency of the plurality of barometric pressure settings; determine that the barometric pressure setting for the first aircraft is different by more than a threshold amount from the measure of central tendency of the plurality of barometric pressure settings; and in response to determining that the barometric pressure setting for the first aircraft is different from the measure of central tendency of the plurality of barometric pressure settings, generating an output indicating that the barometric pressure setting for the first aircraft is different from the measure of central tendency of the plurality of barometric pressure settings.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure is directed to techniques that use a data communication system, such as ADS-B, to determine an incorrect barometric pressure setting for the pressure altimeter. In some examples, the data communication system may also provide a correct altimeter setting.

Outside air pressure can change significantly as weather patterns change, which may lead to inaccurate altitude readings if the barometric pressure setting is not adjusted. The aircraft altimeter has an adjustment setting to correct the altitude reading for changes in outside air pressure. The barometric pressure setting for the aircraft's pressure altimeter is the value of the atmospheric pressure used to adjust the sub-scale of a pressure altimeter so that the altimeter indicates the height of an aircraft above a known reference, e.g. sea level. Failure to set the appropriate pressure setting can result in deviation from the correct altitude, which may result in loss of separation from other air traffic and potential collision with other aircraft or with terrain. For example, an aircraft with the wrong altimeter setting may show that the aircraft is at 5000 feet, but the aircraft may actually be at 4000 feet. If that aircraft is flying in poor visibility near a mountain, a tall transmission tower, or around other air traffic, the inaccurate altimeter setting may pose a danger that the aircraft may collide with other air traffic or features on the ground. Aircraft on cross-country flights traveling below a "transition altitude," e.g. 18,000 feet above sea level in some countries are recommended to update their altimeter setting every 100 statute miles (160 kilometers) or so by checking with a nearby weather station. Aircraft traveling above 18,000 feet may use a standard altimeter setting of, e.g. 29.92 in Hg. When an aircraft above the transition altitude descends while approaching for landing, the aircraft needs to change their altimeter setting to match the local conditions.

The techniques of this disclosure may use ADS-B Out data from other aircraft and ADS-B ground stations in the local area to provide the barometric/altimeter setting in use by the other aircraft. A system of this disclosure may create a sample set of barometric pressure settings received from other aircraft in the vicinity of a first aircraft and identify the altimeter setting used by, for example, a majority of the other aircraft. If the first aircraft's current barometric altimeter setting is different from the setting of the majority of the nearby aircraft sharing the same airspace, the system of this disclosure may determine the first aircraft is using an incorrect setting. In some examples, the flight crew, or operator of the first aircraft may be alerted of a potential incorrect altimeter setting. For example, if the first aircraft is using 29.89 in Hg and the majority of other aircraft are using 29.86, then the system may determine the first aircraft has an incorrect setting. In some examples an alerting message may be provided to the flight crew, as well as provide a recommended altimeter setting.

The techniques of this disclosure differ from other techniques of alerting a flight crew to an incorrect altimeter setting. Some example systems may display an alert to "CHECK BARO SETTING," for example when an aircraft passes below the transition altitude, e.g. 18,000 feet, such as enroute to an airport for landing. Other existing techniques include comparing the aircraft pressure altimeter to other systems on the aircraft, such as predicted GPS altitude, or a calculated altitude from a radar altimeter. When the comparison of the pressure altitude with other aircraft systems differs, existing aircraft systems may alert the flight crew to check the barometric altimeter setting. In contrast, the techniques of this disclosure utilize aircraft operating in the same vicinity to determine a correct altimeter setting, such that when the aircraft all use the same setting, then the separation altitudes set by air traffic control (ATC) may be more accurate.

The techniques of this disclosure also provide other advantages over other existing techniques for checking altimeter setting. As one example, a system of this disclosure may alert the flight crew of the first aircraft if any of the other traffic aircraft is not using the correct altimeter setting. For example, if the first aircraft, and majority of the other aircraft, in the vicinity are using the setting of 29.86, but a second aircraft is using 29.89, then the second aircraft may be highlighted on the first aircraft's traffic display. Because the techniques of this disclosure can continuously compare the first aircraft's altimeter setting with other aircraft and advise the first aircraft of any deviations. For example, ATC may transmit a change to the altimeter setting and other aircraft in the vicinity can switch to the new setting. In case the first aircraft crew forgets to switch to the new setting, this continuously executed monitor may automatically detect and alert the flight crew of the incorrect setting. Though continuously monitored, in some examples, the alerts may be inhibited such as during critical phases like takeoff and final approach.

Figure 1:
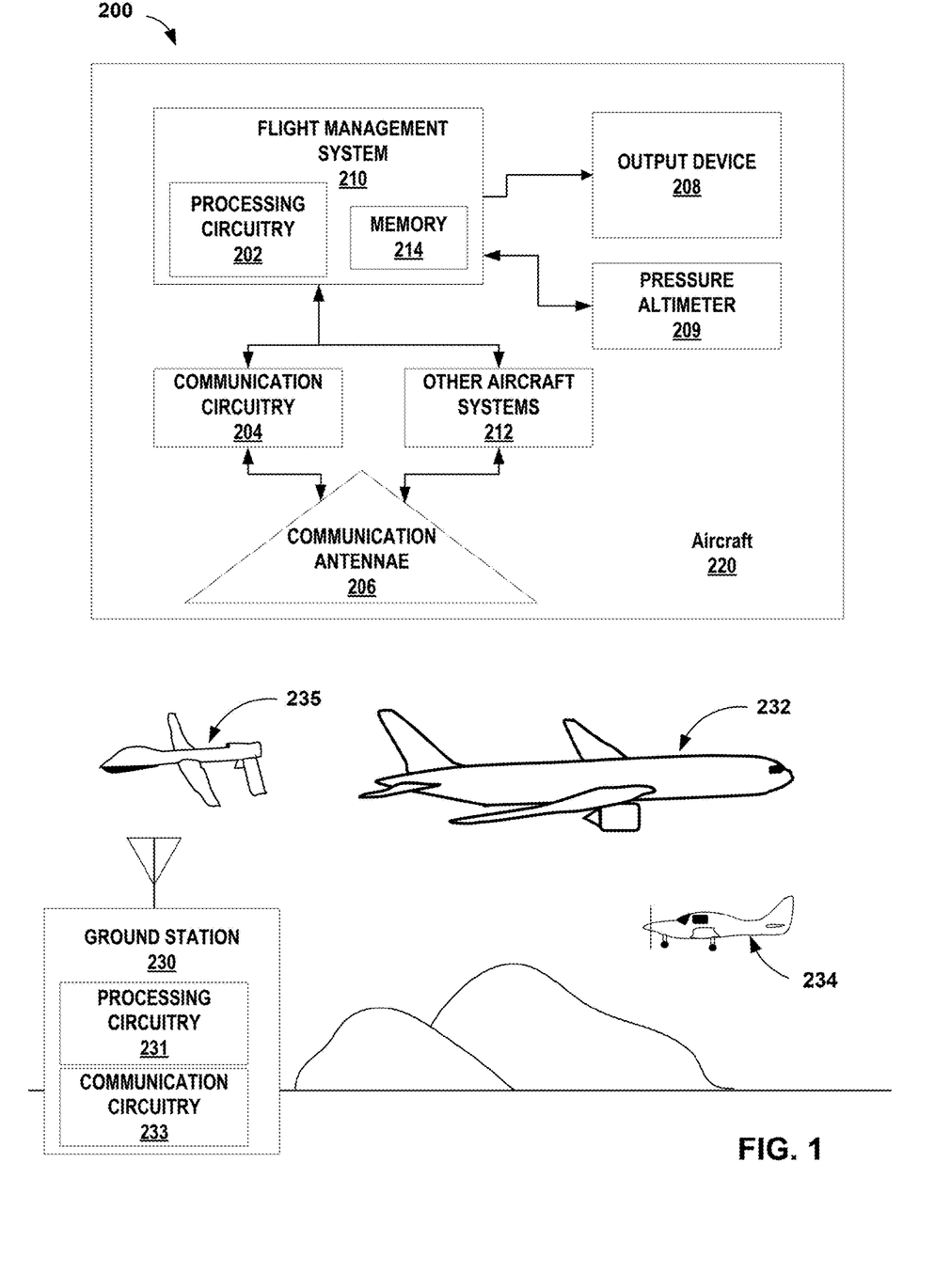
FIG. 1 is a block diagram illustrating an example system that determines and displays an altimeter setting used by aircraft in a predefined volume of airspace, according to one or more techniques of this disclosure.

FIG. 1 is a block diagram illustrating an example system that determines and displays an altimeter setting used by aircraft in a predefined volume of airspace, according to one or more techniques of this disclosure. Aircraft 220 may operate in the same region of airspace as other nearby aircraft such as aircraft 232, aircraft 234 and unmanned aerial vehicle (UAV) 235.

Aircraft 220 may include a system with a flight management system (FMS) 210, a pressure altimeter 209, one or more output devices 208, and communication circuitry 204 coupled to one or more communication antennae 206. Other aircraft systems 212 may also be coupled directly to communication antennae 206, or via communication circuitry 204. Other aircraft systems 212 may include a global positioning system (GPS), radar altimeter, weather radar, voice and data communication systems, attitude and heading reference system (AHRS), engine control systems and similar aircraft systems.

FMS 210 may include, processing circuitry 202, memory 214 and other components not shown in FIG. 1. FMS 210 may include functions like navigation, aircraft systems management and monitoring such as engine status, autopilot, communication, fuel management and status, and similar functions. In this disclosure FMS 210 may refer to a large, complex system in a commercial aircraft, or a smaller, less complex system such as may be installed in UAV 235 or in a private aircraft, such as aircraft 234. FMS 210 may be in signal communication with communication circuitry 204, other aircraft systems 212 and pressure altimeter 209. FMS 210 may communicate with one or more output devices 208.

Processing circuitry 202 may receive a barometric pressure setting for the pressure altimeter on the first aircraft. In some examples, a flight crew member inputs the barometric pressure setting by touch screen, keypad, knob or other control into FMS 210 or directly into pressure altimeter 209. The barometric pressure setting for the geographic area may come from a recorded weather update, e.g. ATIS (Automatic Terminal Information Service), data transfer via communication circuitry 204, voice communication from ATC, or other means.

Processing circuitry 202 may receive, such as via communication circuitry 204, a plurality of barometric pressure settings from aircraft other than aircraft 220, such as aircraft 232 or aircraft 234, that are operating in a predetermined volume of airspace nearby aircraft 220. In some examples, it may be desirable for the predetermined volume of airspace to include a volume near an airport in which the aircraft are either inbound or outbound. ATC for the airport may be able to maintain accurate altitude separation when the inbound or outbound aircraft to the same airport, or to nearby satellite airports, are using the same pressure altimeter setting. Aircraft operating at a significant distance from aircraft 220, e.g. more than 50 NM, may be experiencing different weather conditions and have a different pressure altimeter setting. Therefore, receiving barometric pressure settings from aircraft at a significant distance from aircraft 220 may be less desirable.

The region of airspace may include a volume around an airport, such as within a predetermined radius of a three-dimensional distance from an airport. In other examples the region may be the mode C veil (within 30 NM and up to 10,000 feet) around a large airport with a class B airspace, within the designated class B airspace volume, or other similar airspace designation, which may depend on the rules of country where the airport is located. In other examples, the region of airspace may be a predetermined distance from aircraft 220. The predetermined distance may be a radius defining a cylinder of airspace around aircraft 220 with a predetermined bottom altitude and top altitude. In some examples the predetermined distance from aircraft 220 may define a three-dimensional sphere or some other three-dimensional shape around aircraft 220, such as an ovoid shape with the longer dimension in the direction of travel of aircraft 220.

Processing circuitry 202 may calculate a measure of central tendency for the plurality of barometric pressure settings from the other aircraft. In this disclosure, measures of central tendency may include arithmetic mean (i.e. the average), median, mode (i.e. a majority), or other similar measures of central tendency for a sample of data values. In some examples, processing circuitry 202 may determine what the majority of other aircraft nearby aircraft 220 are using for their barometric pressure setting and compare the barometric pressure setting for aircraft 220 to the pressure setting for the majority of other nearby aircraft.

Processing circuitry 202 may determine that the barometric pressure setting for aircraft 220 is different from the setting used by a majority of other nearby aircraft. Because the barometric pressure setting may be transmitted as a single value by ATIS, ATC or other means, all the nearby aircraft may have the same pressure setting within hundredths of mm Hg. For example, ATIS may broadcast that the current barometric pressure setting for specific airport is 30.02 mm Hg. Therefore, all inbound and outbound aircraft should have the barometric pressure setting for their pressure altimeter set to 30.05 mm Hg. In some examples, processing circuitry 202 may determine that the barometric pressure setting for aircraft 220 differs from the majority of other nearby aircraft by more than a threshold amount, such as ±0.02 mm Hg.

In response to determining that the barometric pressure setting for aircraft 220 is different from the barometric pressure setting of the majority of other aircraft, processing circuitry 202 may generate an output, such as via one or more output devices 208. Output devices 208 may include a digital display, a portion of a primary flight display (PFD) or a multi-function display (MFD), an audio alert, indicator light, or other output. The output may alert a crew member of aircraft 220 that the barometric pressure setting for a pressure altimeter on the first aircraft may be erroneous or should be verified. In the example of a UAV, the output may alert a remote operator of the UAV, such as UAV 235. In some examples, the output generated by processing circuitry 202 may include a display of the measure of central tendency, e.g. the barometric pressure setting of the majority of nearby aircraft. In some examples, processing circuitry 202 may also cross-check the altimeter setting with information received from other systems 212 such as the altitude received from a GPS system, radar altimeter or other sources.

In some examples, processing circuitry 202 may inhibit the output alerting the crew to a possible erroneous barometric pressure altimeter setting. For example, some phases of flight may require a high workload from the crew and a pressure altimeter alert may be a distraction. For example, take-off and final approach to landing may be considered a high-workload phase. Adjusting the pressure setting is less important than other actions during these phases. Processing circuitry 202 may have instructions setting one or more predetermined high-workload phases of flight, where the processing circuitry may inhibit an alert or at least reduce the conspicuousness of alerting the crew. For example, the majority altimeter pressure setting may be displayed near the actual altimeter pressure setting, but during high workload phases, processing circuitry 202 may for example, dim the displayed value, or put both values as the same color rather than turning the majority value a different color or flashing the majority value if the majority altimeter pressure is different from the current pressure setting. In some examples, processing circuitry 202 may inhibit an audio alert during high workload phases of flight.

Examples of processing circuitry 202 may include, any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Memory 214 may store instructions that cause programmable processing circuitry 202 to perform the actions described above. Memory 214 may also store data received from communication circuitry 204, such as the barometric pressure settings from other aircraft, as well as data and measurements from other systems 212, programming instructions and settings from the crew, and similar information. Memory 214 may be any type of computer-readable storage media such as random access memory (RAM).

In some examples, communication circuitry 204 may include an ADS-B transceiver. ADS-B is a surveillance technology that allows ATC and other aircraft to watch airplanes move around. ADS-B includes a network of ground stations, such as ground station 230, and orbiting satellite stations (not shown in FIG. 1) to receive aircraft reports and send them back to ATC, for example, for aircraft that are outside of ADS-B communication range from an ATC facility. ADS-B data transmissions include ADS-B In and ADS-B Out. ADS-B Out includes the ability for properly-equipped aircraft automatically broadcast the aircraft position without the need for a radar interrogation. ADS-B In includes the broadcasted aircraft positions as well as data transmissions from the ground stations that include transmit weather and air traffic information. The air traffic information from the ground stations may include information received from aircraft at a different location and retransmitted via the ground station. ADS-B Out transmissions from aircraft may not only include the aircraft position, speed and direction of flight, but also include how accurate the aircraft position is, the barometric pressure altimeter setting, and other information.

In some examples, ground station 230 may include processing circuitry 231 and communication circuitry 233 (similar to those found in aircraft 220) operable to receive the barometric pressure setting from aircraft operating in a predetermined volume of airspace, e.g. aircraft 220, 232, 234 and 235. Ground station 230 may be near a flight service station, ATC facility, near an airport, or other location. The processing circuitry 231 in ground station 230 may perform functions similar to that described above for processing circuitry 202. For example, processing circuitry 231 may calculate a measure of central tendency for the plurality of barometric pressure settings from the other aircraft received via communication circuitry 233. Processing circuitry 231 may transmit the measure of central tendency to one or more aircraft operating nearby via a variety of means, including automated voice message or a datalink such as controller-pilot data link communications (CPDLC), also referred to as controller pilot data link (CPDL), which is a method by which air traffic controllers can communicate with pilots over a datalink system.

In some examples, processing circuitry 231 at ground station 230 may receive a specific barometric pressure setting to be used for a predetermined region of airspace, i.e. a directed barometric pressure setting. For example, the directed barometric pressure setting may be input to processing circuitry 231 via an automated input from a weather data system, a manual input from ATC, a flight service station, or a weather observer for the region of airspace, or by some other similar source. Processing circuitry 231 at ground station 230 may also receive a plurality of barometric pressure settings for the plurality of aircraft operating in the region of airspace via communication circuitry 233. In some examples, various barometric pressure setting for the plurality of aircraft may be received via ADS-B In. Processing circuitry 231 at ground station 230 may determine that one or more aircraft is using a barometric pressure setting that is different than directed barometric pressure setting and identify the one or more aircraft. In some examples, processing circuitry 231 may determine that the barometric pressure setting for an aircraft exceeds a threshold difference from the directed barometric pressure setting. In response to determining an aircraft is using a barometric pressure setting different from the directed barometric pressure setting, processing circuitry 231 may alert ATC, which may then communicate with the identified aircraft via voice or datalink, such as CPLDC. In other examples, processing circuitry 231 may automatically send an output to the identified aircraft, e.g. via datalink, to alert the aircraft operator to check the barometric pressure setting.

Figure 2:
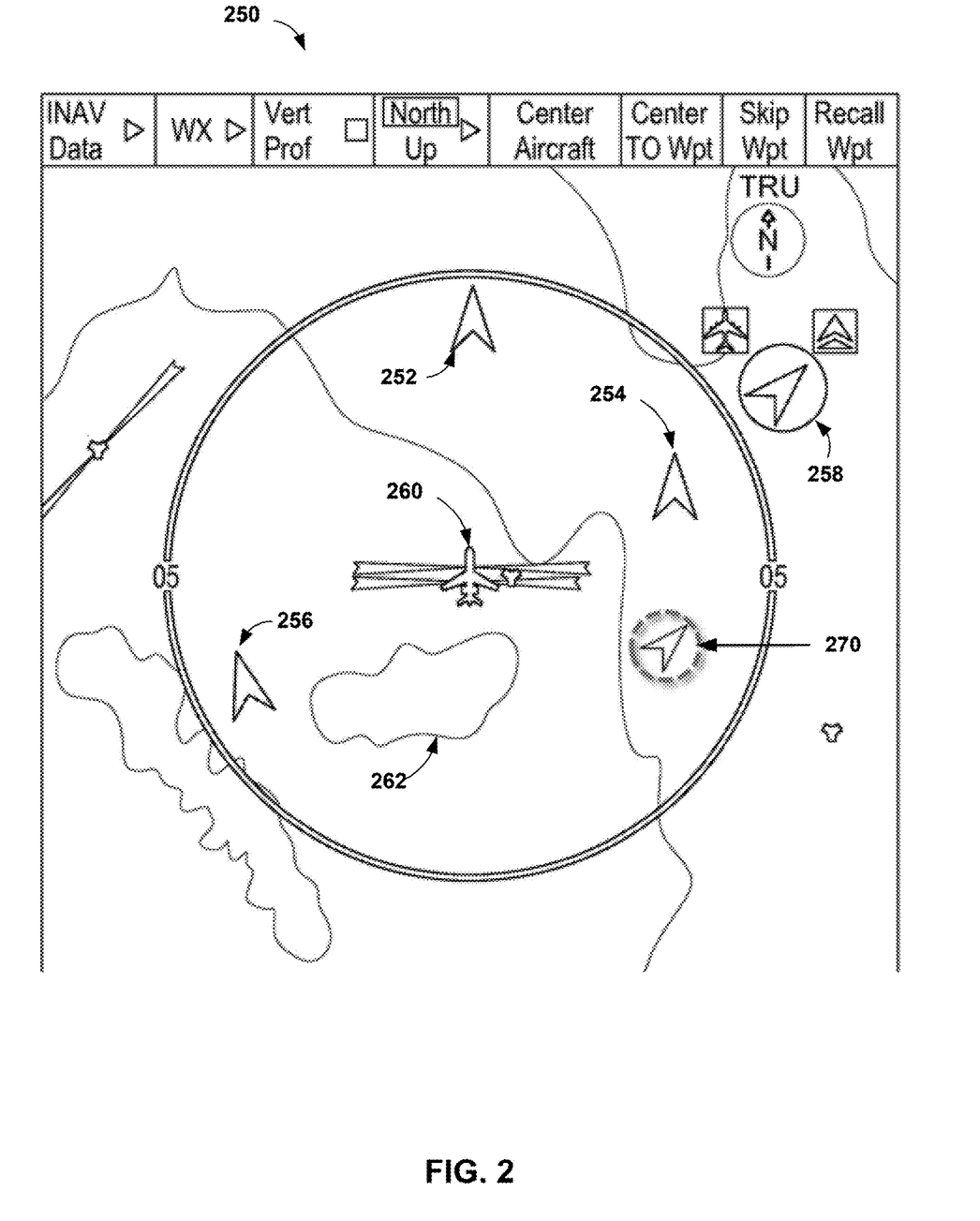
FIG. 2 is a conceptual diagram illustrating an example display output of air traffic in a predefined volume of airspace, according to one or more techniques of this disclosure.

FIG. 2 is a conceptual diagram illustrating an example display output of air traffic in a predefined volume of airspace, according to one or more techniques of this disclosure. Processing circuitry 202 may cause output device 208, described above in relation to FIG. 1, to display the images seen in display output 250 depicted in FIG. 2.

Display output 250 may show a depiction of a first aircraft 260 in which an FMS that includes processing circuitry may be installed. Aircraft 260 in FIG. 2 may correspond to aircraft 220, described above in relation to FIG. 1 and the FMS installed in aircraft 260 may include components and functions similar to those described above for FMS 210.

Display output 250 may include displays of terrain, e.g. 262, controls or status displays, such as those along the top edge of display output 250, weather (not shown in FIG. 2) and other aircraft such as aircraft 252, 254, 256, 258 and 270. In some examples, display output 250 may also include the barometric pressure setting (not shown in FIG. 2).

Processing circuitry onboard aircraft 260 may receive barometric pressure settings from aircraft in the vicinity of aircraft 260, such as aircraft 252, 254, 256, 258 and 270. In some examples, aircraft 260 may receive barometric pressure settings via ADS-B In transmissions, either directly from the other aircraft of from orbiting satellites or ground stations. For example, in mountainous terrain, aircraft 260 may not be able to receive an ADS-B transmission directly from another aircraft, though the other aircraft may be in the vicinity and inbound to the same airport as aircraft 260. Aircraft 260 may receive the barometric pressure setting from the out-of-range aircraft via retransmission from a ground station, for example. Aircraft 260 may also receive barometric pressure settings from other aircraft, or from ATC, via other communication systems.

In some examples, one or more other aircraft in the vicinity of aircraft 260 may be using a barometric pressure setting that is different from the majority of other aircraft in the same vicinity. Processing circuitry on aircraft 260 may cause display output 250 to indicate which aircraft is using a different barometric pressure setting and therefore may be at a different altitude than expected. For example, display output 250 may place a ring around the aircraft, such as depicted by aircraft 270. In other examples, display output 250 may change the color or otherwise indicate that aircraft 270 is using a different altimeter setting.

Figure 3:
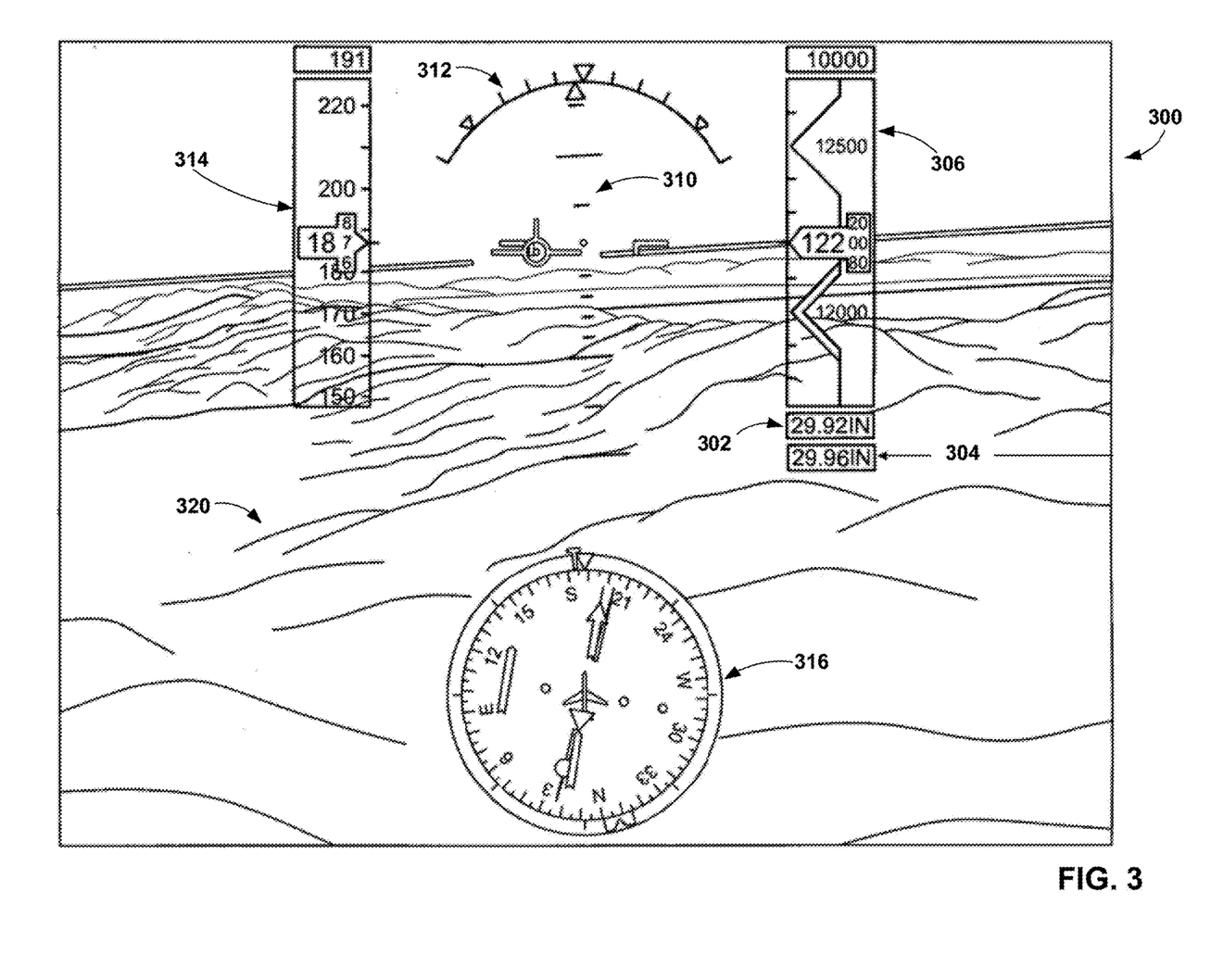
FIG. 3 is a conceptual diagram illustrating a second example display output, according to one or more techniques of this disclosure.

FIG. 3 is a conceptual diagram illustrating a second example display output, according to one or more techniques of this disclosure. Similar to display output 250 described above in relation to FIG. 2, processing circuitry 202 may cause output device 208, described above in relation to FIG. 1, to display the images seen in display output 300. In some examples, display output 300 may be called a primary flight display (PFD). In other examples, a display similar to display output 300 may be output to a heads up display (HUD). Display output 300 may be displayed on output device 208 depicted in FIG. 1. Other examples of generated outputs may include an indication shown on a multi-function control and display unit (MCDU), near-to-eye (NTE) display, heads down display, such as an MFD, or an electronic flight bag device such as a tablet computer and similar displays. In the example of a UAV, the output may appear on the operating console.

Display output 300 may include a barometric pressure setting 302 as well as an indication of the measure of central tendency (304), such as the barometric pressure setting value for the majority of other aircraft in the vicinity such as aircraft 232, aircraft 234 or UAV 235 depicted in FIG. 1, as well as aircraft 252-258 depicted in FIG. 2. In the example of FIG. 3, majority value 304 is different from the current barometric pressure setting 302 for the aircraft using display output 300, such as aircraft 220 described above in relation to FIG. 1. Therefore, one or more processors that control the content of display output 300, such as processing circuitry 202 described above in relation to FIG. 1, may cause majority value 304 and/or barometric pressure setting 302 to alert the flight crew, for example, "CHECK BARO SET: 30.35." In some examples, one or both of majority value 304 or barometric pressure setting 302 may flash, turn a different color (e.g. red instead of green), or provide some other indication that barometric pressure setting 302 needs attention. In other examples, the crew may receive an audio alert, or some other generated output. As described above in relation to FIG. 1, this alert may be minimized, inhibited (i.e. canceled) during certain predetermined phases of flight.

Barometric pressure setting 302 may impact the value of altitude displayed on altitude indicator 306. In the example of FIG. 3, if the majority of other nearby aircraft are using 29.96 in Hg as their altimeter setting, then the aircraft with the different setting of 29.92 in Hg may have an actual separation different from the expected separation altitude set by ATC.

Other elements of display output 300 may include pitch indicator 310, angle of bank indicator 312, airspeed indicator 314, and direction indicator 316. In the example of FIG. 3, display output 300 also includes an indication of the surrounding terrain (320). In some examples terrain indication 320 may be a synthetic vision depiction of the terrain. In the example of mountainous terrain, an inaccurate barometric pressure setting may lead to an aircraft colliding with the terrain or other structures such as a tower. In other words, inaccurate barometric pressure setting may lead to controlled flight into terrain (CFIT).

Figure 4:
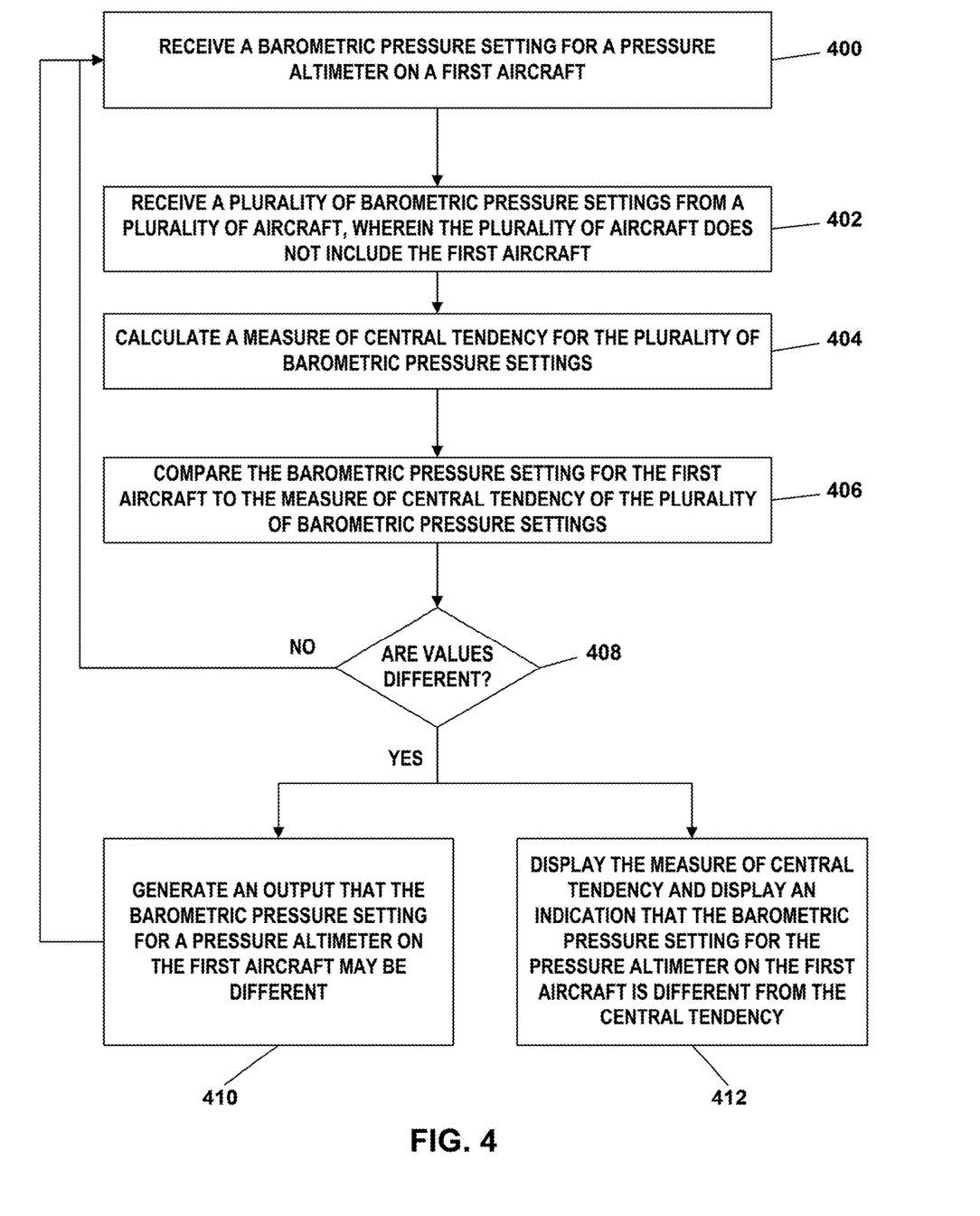
FIG. 4 is a flowchart illustrating an example operation of a system according to one or more techniques of this disclosure.

FIG. 4 is a flowchart illustrating an example operation of a system according to one or more techniques of this disclosure. The process steps of FIG. 4 will be described in terms of FIG. 1, unless otherwise noted.

Processing circuitry on a first aircraft, such as processing circuitry 202 as part of FMS 210, may receive a barometric pressure setting for a pressure altimeter on the first aircraft (400). In some examples, the barometric pressure setting may be manually set by a flight crew member directly into a pressure altimeter, such as pressure altimeter 209, which is in signal communication with processing circuitry 202. In other examples, the barometric pressure setting may be set using input commands to FMS 210.

Processing circuitry 202 may also receive via a communications device, such as communication circuitry 204 and communication antennae 206, a plurality of barometric pressure settings from a plurality of other aircraft different from the first aircraft (402). The other aircraft may be operating in the same vicinity as the first aircraft, such as inbound or outbound from the same airport. Communication circuitry 204 may receive the barometric pressure settings over a variety of communication channels. In some examples, the communication channel may be ADS-B. Other examples of communication channels include datalink, voice messages from air traffic controllers, aviation operational control (AOC) systems, ATIS messages, traffic information system (e.g. TIS-B) messages and similar examples.

The processing circuitry may calculate a measure of central tendency for the sample set of barometric pressure settings from the other aircraft (404). Some example measures of central tendency may include an average or a majority (i.e. the mode) of the sample set.

Processing circuitry 202 may compare the barometric pressure setting for the first aircraft to the measure of central tendency of the sample set of barometric pressure settings from the other aircraft (406). The barometric pressure setting is selected based on the weather conditions in the area and may be broadcast to aircraft in the area by ATIS, data transmission, voice communication or other means. All aircraft operating in the same area, for example, within about 100 NM, may use the same barometric pressure setting to ensure accurate altitude above terrain features as well as accurate altitude separation from other aircraft.

The processing circuitry may determine whether the barometric pressure setting for the first aircraft is different from the measure of central tendency of the sample set of barometric pressure settings from other aircraft (408). If the values are not different, the processing circuitry may continue to monitor the barometric pressure settings for nearby aircraft (NO branch of 408). In some examples, processing circuitry 202 may also identify other nearby aircraft that are using a barometric pressure setting that is different from the measure of central tendency.

In response to determining that the barometric pressure setting for the first aircraft is different from the measure of central tendency of the sample set of barometric pressure settings (YES branch of 408) the processing circuitry may generate an output to a crew member of the first aircraft (410). The output may include a visual display, audible alert, or similar indication. In some examples, the output may include displaying the measure of central tendency on an output device, such as described for display output 300 in relation to FIG. 3 (412). The generated output may alert a crew member that the barometric pressure setting for a pressure altimeter on the first aircraft may be erroneous and should be verified. In some examples, the generated output may be disabled or at least muted or made less conspicuous during critical phases of flight.

In one or more examples, the functions described above may be implemented in hardware, software, firmware, or any combination thereof. For example, the various components of FIG. 1, such as FMS 210 and processing circuitry 202 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors or processing circuitry to retrieve instructions, code and/or data structures for implementation of the techniques described in this disclosure. A computer program product may include a computer-readable medium.

By way of example, and not limitation, such computer-readable storage media, such as memory 214, can comprise RAM, ROM, EEPROM, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes optical disc, floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as processing circuitry 202 may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A method comprising:
  receiving, by processing circuitry on a first aircraft, a barometric pressure setting for a pressure altimeter on the first aircraft;
  receiving, by the processing circuitry and via a communications device, a plurality of barometric pressure settings from a plurality of aircraft, wherein the plurality of aircraft does not include the first aircraft;
  calculating, by the processing circuitry, a measure of central tendency for the plurality of barometric pressure settings;
  comparing, by the processing circuitry, the barometric pressure setting for the first aircraft to the measure of central tendency of the plurality of barometric pressure settings;
  determining, by the processing circuitry, that the barometric pressure setting for the first aircraft is different from the measure of central tendency of the plurality of barometric pressure settings;
  in response to determining that the barometric pressure setting for the first aircraft is different from the measure of central tendency of the plurality of barometric pressure settings, generating, by the processing circuitry, an output indicating that the barometric pressure setting for the first aircraft is different from the measure of central tendency of the plurality of barometric pressure settings.

2. The method of claim 1, further comprising, causing, by the processing circuitry, the communications device to transmit the barometric pressure setting for the pressure altimeter on the first aircraft.

3. The method of claim 2, wherein the communication device comprises an Automatic Dependent Surveillance-Broadcast (ADS-B) transceiver.

4. The method of claim 1, wherein the plurality of aircraft is in a vicinity of the first aircraft, wherein the vicinity comprises within a predetermined distance from an airport.

5. The method of claim 1, wherein the plurality of aircraft is in a vicinity of the first aircraft, wherein the vicinity comprises within a predetermined three-dimensional distance from the first aircraft.

6. The method of claim 1, wherein generating an output comprises causing, by the processing circuitry, an output device to:
  display the barometric pressure setting for the pressure altimeter on the first aircraft;
  display the measure of central tendency of the plurality of barometric pressure settings;
  display an indication that the barometric pressure setting for the pressure altimeter on the first aircraft is different from the central tendency.

7. The method of claim 1, wherein the measure of central tendency is selected from a group comprising: arithmetic mean, median, and mode.

8. The method of claim 1, wherein determining whether the barometric pressure setting for the first aircraft is different from the measure of central tendency of the plurality of barometric pressure settings comprises determining, by the processing circuitry, whether the difference between the barometric pressure setting for the first aircraft and the central tendency exceeds a threshold difference.

9. The method of claim 1, wherein receiving, via the communications device, the plurality of barometric pressure settings from the plurality of aircraft comprises, receiving signals comprising the plurality of barometric pressure settings from one or more ground stations or one or more orbiting satellites.

10. The method of claim 1, wherein during one or more predetermined high-workload phases of flight, the processing circuitry reduces a conspicuousness of the generated output.

11. A system comprising:
  a pressure altimeter;
  a communications device;
  processing circuitry installed on a first aircraft, the processing circuitry in signal communication with the pressure altimeter and the communications device, wherein the processing circuitry is configured to:
    receive a barometric pressure setting for the pressure altimeter on the first aircraft;
    receive via the communications device, a plurality of barometric pressure settings from a plurality of aircraft, wherein the plurality of aircraft does not include the first aircraft;
    calculate a measure of central tendency for the plurality of barometric pressure settings;
    compare the barometric pressure setting for the first aircraft to the measure of central tendency of the plurality of barometric pressure settings;
    determine that the barometric pressure setting for the first aircraft is different by more than a threshold amount from the measure of central tendency of the plurality of barometric pressure settings; and in response to determining that the barometric pressure setting for the first aircraft is different from the measure of central tendency of the plurality of barometric pressure settings, generating an output indicating that the barometric pressure setting for the first aircraft is different from the measure of central tendency of the plurality of barometric pressure settings.

12. The system of claim 11, wherein the communication device comprises an Automatic Dependent Surveillance-Broadcast (ADS-B) transceiver.

13. The system of claim 11, wherein the processing circuitry is configured to generate the output by causing an output device to:
- display the barometric pressure setting for the pressure altimeter on the first aircraft;
- display the measure of central tendency of the plurality of barometric pressure settings;
- display an indication that the barometric pressure setting for the pressure altimeter on the first aircraft is different from the central tendency.

14. The system of claim 11, wherein the processing circuitry is further configured to compare an altitude determined by the pressure altimeter to an altitude determined by one or more other altitude measurements.

15. A computer-readable storage medium comprising instructions for causing programmable processing circuitry to:
- receive a barometric pressure setting for a pressure altimeter on a first aircraft, wherein the programmable processing circuitry is installed on the first aircraft and in signal communication with the pressure altimeter, a communications device and an output device, each of which is installed on the first aircraft;
- receive via the communications device, a plurality of barometric pressure settings from a plurality of aircraft, wherein the plurality of aircraft does not include the first aircraft;
- calculate a measure of central tendency for the plurality of barometric pressure settings;
- compare the barometric pressure setting for the first aircraft to the measure of central tendency of the plurality of barometric pressure settings;
- determine that the barometric pressure setting for the first aircraft is different by more than a threshold amount from the measure of central tendency of the plurality of barometric pressure settings; and
- in response to determining that the barometric pressure setting for the first aircraft is different from the measure of central tendency of the plurality of barometric pressure settings, generating an output indicating that the barometric pressure setting for the first aircraft is different from the measure of central tendency of the plurality of barometric pressure settings.

16. The computer-readable storage medium of claim 15, wherein the communication device comprises an Automatic Dependent Surveillance-Broadcast (ADS-B) transceiver.

17. The computer-readable storage medium of claim 15, wherein the plurality of aircraft is in a vicinity of the first aircraft, wherein the vicinity comprises within a predetermined radius of a three-dimensional distance from an airport.

18. The computer-readable storage medium of claim 15, wherein the processing circuitry is configured to cause the output device to:
- display the barometric pressure setting for a pressure altimeter on the first aircraft;
- display the measure of central tendency of the plurality of barometric pressure settings;
- display an indication that the barometric pressure setting for the pressure altimeter on the first aircraft is different from the central tendency.

19. The computer-readable storage medium of claim 15, wherein the measure of central tendency is selected from a group comprising: arithmetic mean, median, and mode.

20. The computer-readable storage medium of claim 15, wherein to determine whether the barometric pressure setting for the first aircraft is different from the measure of central tendency of the plurality of barometric pressure settings comprises the processing circuitry determining whether the difference between the barometric pressure setting for the first aircraft and the central tendency exceeds a threshold difference.

* * * * *